US010216252B2

(12) United States Patent
Foreman et al.

(10) Patent No.: US 10,216,252 B2
(45) Date of Patent: *Feb. 26, 2019

(54) VOLTAGE AND FREQUENCY BALANCING AT NOMINAL POINT

(71) Applicant: International Business Machines Corporation, Armonk, NY (US)

(72) Inventors: Eric A. Foreman, Fairfax, VT (US); Stephen G. Shuma, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,602

(22) Filed: Apr. 13, 2018

(65) Prior Publication Data

US 2018/0210534 A1 Jul. 26, 2018

Related U.S. Application Data

(63) Continuation of application No. 15/286,903, filed on Oct. 6, 2016.

(51) Int. Cl.
*G06F 17/50* (2006.01)
*G06F 1/324* (2019.01)

(52) U.S. Cl.
CPC .......... *G06F 1/324* (2013.01); *G06F 17/5031* (2013.01); *G06F 17/5045* (2013.01);
(Continued)

(58) Field of Classification Search
CPC .. G06F 1/324; G06F 17/5045; G06F 2217/78; H05K 999/99
(Continued)

(56) References Cited

U.S. PATENT DOCUMENTS 7,239,997 B2 * 7/2007 Yonezawa ........... G06F 17/5022
703/13
7,401,307 B2 7/2008 Foreman et al.
(Continued)

OTHER PUBLICATIONS

Lai et al., "SlackProbe: A Low Overhead In Situ On-line Timing Slack Monitoring Methodology", UCLA Electrical Engineering Dept., © 2013 EDA, 6 Pages.
(Continued)

*Primary Examiner* — Jack Chiang
*Assistant Examiner* — Brandon Bowers
(74) *Attorney, Agent, or Firm* — Christopher K. McLane

(57) ABSTRACT

In an approach for determining voltage and frequency pairs, the computer identifies an integrated circuit design. The computer identifies a timing model associated with the identified integrated circuit design. The computer identifies at least a nominal voltage, a nominal clock signal, and a voltage range associated with the integrated circuit design. The computer receives a number n that defines the number of at least one alternate voltage within the voltage range. The computer analyzes the identified integrated circuit based on the received number n for each number n for at least one alternate voltage within the voltage range. The computer calculates a nominal slack. The computer calculates one or more clock periods based on the calculated nominal slack. The computer provides a report based on the calculated one or more clock periods.

1 Claim, 3 Drawing Sheets

(52) U.S. Cl.
CPC ...... *G06F 2217/10* (2013.01); *G06F 2217/78* (2013.01); *G06F 2217/84* (2013.01)

(58) Field of Classification Search
USPC ......................................................... 716/108
See application file for complete search history.

(56) References Cited

U.S. PATENT DOCUMENTS

| | | | |
|---|---|---|---|
| 7,469,394 B1 * | 12/2008 | Hutton | G06F 8/41 716/113 |
| 7,555,740 B2 | 6/2009 | Buck et al. | |
| 8,341,576 B2 * | 12/2012 | Horikoshi | G06F 17/5031 327/276 |
| 8,539,424 B2 | 9/2013 | Tetelbaum | |
| 8,547,164 B2 | 10/2013 | Flores et al. | |
| 8,635,478 B2 | 1/2014 | Chase et al. | |
| 8,719,763 B1 | 5/2014 | Bickford et al. | |
| 8,856,709 B2 | 10/2014 | Foreman et al. | |
| 8,928,394 B2 | 1/2015 | Park | |
| 9,495,497 B1 * | 11/2016 | Buck | G06F 17/5045 |
| 2008/0307240 A1 | 12/2008 | Dahan et al. | |

OTHER PUBLICATIONS

Sinha et al., "Sharing and Re-Use of Statistical Timing Macromodels across Multiple Voltage Domains", IEEE Computer Society, 2016 29th International Conference on VLSI Design and 2016 15th International Conference on Embedded Systems, DOI 10.1109/VLSID.2016.17, © 2016 IEEE, 6 Pages.

Zolotov et al, "Timing Analysis with Nonseparable Statistical and Deterministic Variations", DAC 2012, Jun. 3-7, 2012, San Francisco, California, USA, Copyright 2012 ACM 978-1-4503-1199-1/12/06, 6 pages.

Foreman et al., "Voltage and Frequency Balancing at Nominal Point", U.S. Appl. No. 15/286,903, filed Oct. 6, 2016, 36 pages.

Foreman et al., "Voltage and Frequency Balancing at Nominal Point", U.S. Appl. No. 15/952,558, filed Apr. 13, 2018, 31 pages.

IBM Appendix P, list of patents and patent applications treated as related, filed herewith, 2 pages.

* cited by examiner

VOLTAGE AND FREQUENCY BALANCING AT NOMINAL POINT

BACKGROUND

The present invention relates generally to the field of statistical static timing analysis, and more particularly to balancing voltage and frequency with a nominal voltage/frequency point.

An integrated circuit (also known as a microcircuit, a microchip, a silicon chip, or a chip) is a miniaturized electronic circuit consisting of mainly semiconductor devices and passive components, manufactured in a surface of a thin substrate of semiconductor material. The integrated circuit is constructed from small electronic circuits called logic gates (i.e., an idealized or physical device implementing a Boolean function that performs a logical operation on one or more logical inputs) that produces a single logical output resulting in an electrical flow or voltage, which can control more logic gates. Operation of the integrated circuit is characterized by a clock frequency (e.g., clock signal). The clock signal oscillates between a high and a low state to coordinate actions of integrated circuits. The logic gates can control the clock signal to effectively enable or disable a portion of the integrated circuit. To gauge the ability of the integrated circuit to operate at a specified speed, measurements of the delays are taken throughout the design process.

Delay calculation, calculates the gate delay (i.e., a length of time between when the input to a logic gate becomes stable and valid to change to the time that the output of that logic gate is stable and valid to change) of a single logic gate (i.e.,) and the delay created by the attached wires. Calculation of the gate delay may be provided by circuit simulators, two dimensional tables (e.g., logic synthesis), placement and routing (i.e., tables take an output load and input slope, and generate a circuit delay and output slope), and K factor models (i.e., approximates the delay as a constant plus k times the load capacitance). Calculation of the wire delay may be provided by a lumped C (i.e., entire wire capacitance is applied to the gate output, and the delay through the wire itself is ignored), an Elmore delay (i.e., delay of each wire segment is an electrical resistance (R) of that segment times the electrical capacitance (downstream C), moment matching (i.e., matches multiple moments in the time domain, or finds a good rational approximation in the frequency domain), and circuit simulators.

Static timing analysis (STA) is an input-independent method of analyzing a frequency or a clock rate (e.g., validating the timing performance) for an integrated circuit by simulating the delays of entire paths of an integrated circuit without requiring a simulation of the full integrated circuit. STA breaks down the design of the integrated circuit into a set of timing paths, calculates the signal propagation delay along each path (i.e., time required for a digital signal to travel from the input of a logic gate to the output), and checks for violations of timing constraints. Two kinds of violations (e.g., timing errors) are possible: a setup time violation and a hold time violation. A setup time violation is based on a setup constraint that specifies an amount of time that is necessary for data to be available (e.g., stable) at the input of a sequential device before the clock edge that the input signal needs to guarantee the input signal is properly accepted on the clock edge that captures the data in the device. The hold time violation is based on a hold constraint that specifies how much time is necessary for data to be stable at the input of a sequential device after receiving the clock edge (i.e., the hold constraint enforces a minimum delay on the data path relative to the clock path).

Statistical static timing analysis (SSTA) is an alternative to STA. SSTA replaces fixed or normal deterministic timing of gates and interconnects with probability distributions (e.g., a range of probabilities), thereby returning a distribution of possible circuit outcomes rather than a single outcome. SSTA employs a sensitivity based approach to model the effect of variations on timing by determining how a change in a particular device or interconnect parameter (e.g., oxide, wire thickness, etc.) affects a desired property (e.g., slew, capacitance, etc.). The sensitivity to the parameter in conjunction with the probability distribution (i.e., mean and standard deviation) provides a statistical model describing the probability that a parameter will have a certain effect on a device or interconnect property. SSTA uses sensitivities to identify correlations among delays, and utilizes the correlations when computing how to add statistical distributions of delays (i.e., model the effect on timing). The SSTA maps the standard deviations with respect to the devices and interconnect parameters to obtain an overall standard deviation of the path delay. Algorithms for SSTA include a path-based method, in which a path based algorithm sums gate and wire delays on specific paths and block-based methods, in which a block-based algorithm generates the arrival times and required times for each node, working both forward and backward from the clocked elements.

SUMMARY

Aspects of the present invention disclose a method, computer program product, and system for determining voltage and frequency pairs, the method comprises computer processors identifying an integrated circuit design. The method further comprises the computer processors identifying a timing model associated with the identified integrated circuit design. The method further comprises the computer processors identifying at least a nominal voltage, a nominal clock signal, and a voltage range associated with the integrated circuit design. The method further comprises the computer processors receiving a number n that defines the number of at least one alternate voltage within the voltage range. The method further comprises the computer processors analyzing the identified integrated circuit based on the received number n for each number n for at least one alternate voltage within the voltage range. The method further comprises the computer processors calculating a nominal slack. The method further comprises the computer processors calculating one or more clock periods based on the calculated nominal slack. The method further comprises the computer processors providing a report based on the calculated one or more clock periods.

DETAILED DESCRIPTION

Very-large-scale integration (VLSI) is a process of creating an integrated circuit (IC) by combining thousands of transistors into a single chip (i.e., a single small plate of semiconductor material). During VLSI chip and/or core operation, the voltage and frequency change in order to maintain an overall power budget for changing workloads. Embodiments of the present invention recognize that an acceptable voltage range and nominal (i.e., ideal) frequency are known and utilized while designing the VLSI chip. Embodiments of the present invention also recognize that during hardware disposition (e.g., placement, arrangement, etc.) of the VLSI chip based on the design, a best voltage and frequency pairing are selected. However, embodiments of the present invention also recognize that by only utilizing the nominal targets during design closure, non-optimal timing at alternate voltage/frequency pairings result (i.e., a few paths of the VLSI chip will limit the ability to adjust voltage and frequency). Embodiments of the present invention recognize that an optimal voltage/frequency pairings can be determined from knowledge gained through multiple timing runs, which include assertion sets and unique process corners (i.e., a variation of fabrication parameters used in applying an integrated circuit design to a semiconductor wafer), and trial-and-error iterations, however, linear changes in frequency and voltage may not be assumed.

Embodiments of the present invention, determine optimal voltage/frequency pairs. Embodiments of the present invention balance voltage and frequency for a VLSI chip design by balancing a nominal voltage/frequency through a single statistical static timing analysis (SSTA). In some embodiments of the present invention, the SSTA also includes multi-corner projection. Embodiments of the present invention calculate a nominal slack (i.e., difference between the required time and the arrival time between gates of a path within a VLSI chip design) based on the nominal voltage and frequency. Embodiments of the present invention utilize the nominal slack to calculate additional voltage/frequency pairings, by varying the voltage, and solving for the frequency (i.e., period known as the time to complete a waveform cycle) within a single clock period.

Figure 1:
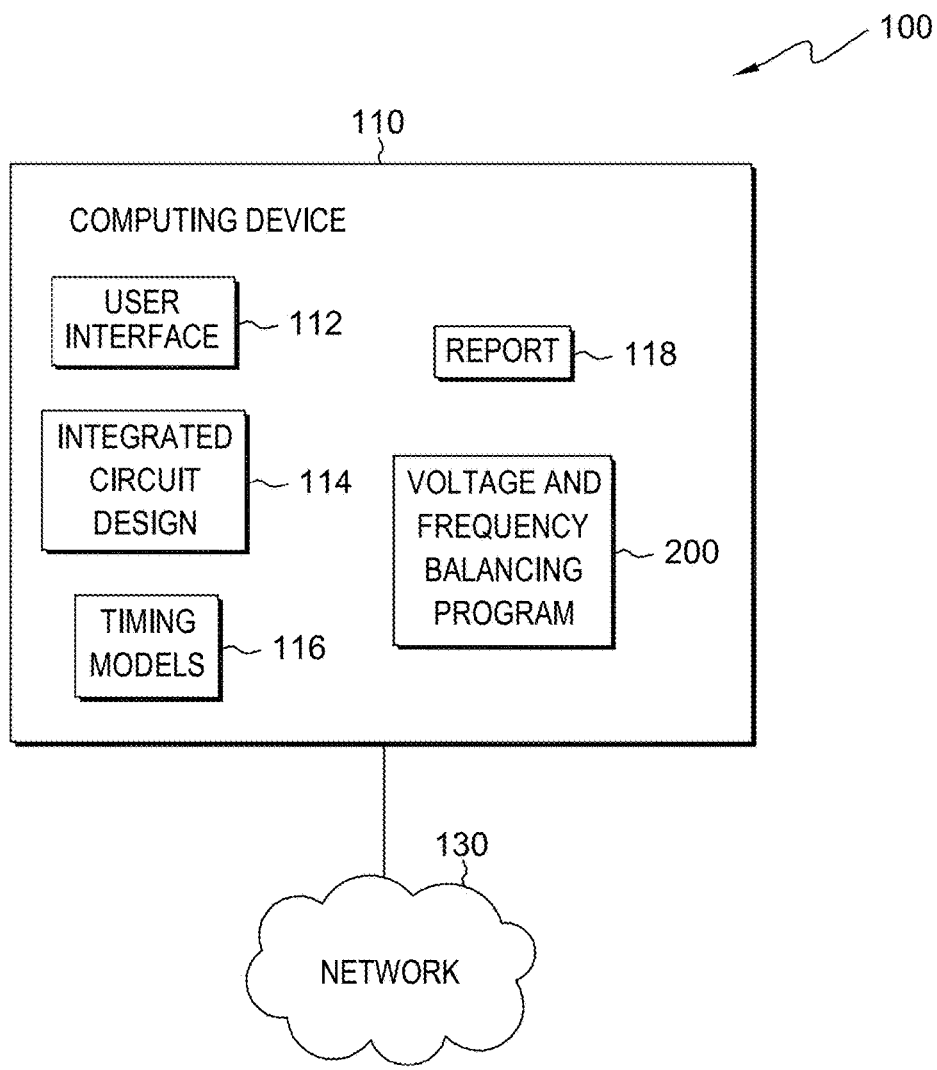
FIG. 1 is a functional block diagram illustrating a statistical static timing analysis environment, in accordance with an embodiment of the present invention.

The present invention will now be described in detail with reference to the Figures. FIG. 1 is a functional block diagram illustrating a statistical static timing analysis environment, generally designated 100, in accordance with one embodiment of the present invention. FIG. 1 provides only an illustration of one embodiment and does not imply any limitations with regard to the environments in which different embodiments may be implemented.

In the depicted embodiment, statistical static timing analysis environment 100 includes computing device 110 and network 130. Statistical static timing analysis environment 100 may include additional computing devices, mobile computing devices, servers, computers, storage devices, networks, or other devices not shown.

Computing device 110 may be a web server or any other electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating over network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. Computing device 110 contains user interface 112, integrated circuit design 114, timing models 116, report 118, and voltage and frequency balancing program 200.

User interface 112 is a program that provides an interface between a user of computing device 110 and a plurality of applications that reside on computing device 110 (e.g., voltage and frequency balancing program 200). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to voltage and frequency balancing program 200.

Integrated circuit design 114 is the schematic or physical design for the construction of an integrated circuit that identifies electronic components (e.g., transistors, resistors, capacitors, wires, logic gates, etc.), a metallic interconnect material, electrical connections, and placement of the electronic components on a piece of semiconductor to create a chip. Creation of integrated circuit design 114 follows an integrated circuit design process that includes: a micro-architecture and system level design (i.e., defines functionality of the integrated circuit and specifications), a register-transfer level (RTL) design (i.e., behavioral model of actual operational functionality), and the physical design (i.e., maps the RTL design into an actual geometric representations of all electronics devices). The physical design includes: logic synthesis, floor planning, placement, logic/placement refinement, clock insertion, routing, post wiring optimization, design for manufacturability, final error checking, and tapeout. Design closure occurs during post wiring optimization, in which violations to performance (i.e., timing closure), noise (i.e., signal integrity), and yield (i.e., design for manufacturability) are removed. In an exemplary embodiment, voltage and frequency balancing program 200 initiates within system level design. In another embodiment, voltage and frequency balancing program 200 initiates at any point during the creation of integrated circuit design 114, in which at least an initial instance of integrated circuit design 114 is available. In the depicted embodiment, integrated circuit design 114 resides on computing device 110. In another embodiment, integrated circuit design 114 may reside on a server or another computing device (not shown) connected to network 130 provided integrated circuit design 114 is available to voltage and frequency balancing program 200.

Timing models 116 is a library file that identifies delay models (i.e., timing response model) for the electrical components (e.g., inverter, AND gate, OR gate, etc.) of integrated circuit design 114. The delay (e.g., timing response) is the time that passed while a data signal propagates from a starting point to an ending point through a timing path within integrated circuit design 114. Timing models 116 includes a table with the delays that provides a slew rate/load and process/voltage/temperature condition for inputs and outputs of the electrical component in a particular semiconductor technology. The slew rate is a rate of change of voltage per unit of time measured in volts/second and may specify minimum or maximum limits on for inputs and/or outputs, with the limits only valid for a set of provided conditions (e.g., output loading). For an output, the slew rate guarantees that the speed of the output signal transition will be at least a given minimum, or at most the given maximum. For an input, the slew rate indicates that the external driving circuitry needs to meet specified limits in order to guarantee correct operation of a receiving device. Process conditions identify deviations in the semiconductor fabrication process, measured as a percentage variation in a performance calculation, such as variations to impurity concentration densities, oxide thicknesses, and diffusion depths.

Voltage conditions can vary from established ideal value during day-to-day operation, thus changing the delay. For example, a higher voltage reduces the delay (e.g., increases speed), whereas a lower voltage increases the delay (e.g., decreases speed) of integrated circuit design 114. Temperature conditions vary during operation of the chip due to power dissipation (i.e., rate of energy transfer), in which power is converted to heat, thereby increasing a surrounding temperature, which causes an increase in the delay. Each process/voltage/temperature condition within timing models 116 defines a process corner, which specifies the delay of the gates at that process/voltage/temperature condition. The process corner represents a sigma variation (i.e., standard deviation) from nominal doping concentrations to electrical components on the chip (e.g., silicon wafer, slice, semiconductor material, etc.), which changes a duty cycle and slew rate. In the depicted embodiment, timing models 116 resides on computing device 110. In another embodiment, timing models 116 may reside on a server or another computing device (not shown) connected to network 130 provided timing models 116 is available to voltage and frequency balancing program 200.

Report 118 is the output results of voltage and frequency balancing program 200. In one embodiment, report 118 is a test report detailing the analysis of integrated circuit design 114 by voltage and frequency balancing program 200. In another embodiment, report 118 identifies optimal voltage/frequency pairings for integrated circuit design 114 based on slack values as calculated by voltage and frequency balancing program 200. Slack is the difference between the required time and the arrival time between gates within integrated circuit design 114. Positive slack implies that the arrival time at a node may be increased without affecting the overall delay of the circuit. Conversely, negative slack implies that a path is too slow, and the path must be sped up or incorporate a delay of the reference signal in order for the whole circuit to work at the desired speed. Additionally, voltage and frequency balancing program 200 identifies optimal voltage/frequency pairings based on performance and frequency requirements, which offer a best power-performance balance.

In some other embodiments, report 118 may include graphs that depict a histogram, a slack wall, and/or a yield curve. A histogram represents the distribution associated with the voltage and frequency pairs over a given voltage range. A slack histogram also can be reported, which depicts counts of specific slacks across all timing test points in integrated circuit design 114. The slack wall depicts a data spike in which the slack value remains virtually constant (i.e., may have the same slack value, or slight variations within tolerance) while a parameter varies, thereby forming a stack, spike, and/or wall in the data for a specific point (e.g., design element) within integrated circuit design 114. The slack wall indicates an area within integrated circuit design 114 in which a design element or parameter is a limiting factor. As recognized by a person of ordinary skill in the art, modification of the design of integrated circuit design 114 to eliminate and/or move the slack wall may be difficult. In an instance in which a new variability is introduced into integrated circuit design 114, if the new variability causes a timing degradation, then many of the tests performed would show a failure at the slack wall. The yield curve within report 118, represents the output produced and/or provided by the slack calculations that represent integrated circuit design 114. Voltage and frequency balancing program 200 creates the yield curve by calculating a limiting slack distribution across all tests (i.e., Gaussian distribution representing individual paths of integrated circuit design 114 with the worst slacks (e.g., paths with negative slack, paths that include a slack that meets and/or exceeds a tolerance based on designed performance, paths with the longest timing delays, etc.) with respect to voltage in which standard deviation is the variation). Voltage and frequency balancing program 200 integrates the probability density of the worst slacks, which leaves a cumulative distribution function that represents the yield curve. In interpreting the yield curve, as the slack becomes more positive, a higher number of VLSI chips are functional, thereby resulting in a higher yield (i.e., larger amount of usable product is produced) and provides information to alter the clock speed and/or voltage to improve yield. In general, the yield curves slope upward asymptotically (i.e., as the curve move to the right the curve flattens).

In addition, report 118 may include additional information pertaining to the critical path, arrival time, required time, slack, and verification of proper circuit performance with respect to the nominal voltage and frequency and over the given voltage range for a time period and/or varying time periods (e.g., time to complete the waveform cycle). The critical path defines the path between an input and output with the maximum delay. The arrival time is the time elapsed for a signal to arrive at a certain point. The required time is the latest time at which a signal can arrive without making the clock cycle longer than desired. In yet some other embodiments, report 118, includes one or more of the aforementioned output results (e.g., combination of detailed analysis, optimized voltage/frequency pairs, graphs, etc.). In the depicted embodiment, report 118 resides on computing device 110. In another embodiment, report 118 may reside on a server or another computing device (not shown) connected to network 130 provided voltage and frequency balancing program 200 is able to access the server or the another computing device (not shown) over network 130.

In an exemplary embodiment, voltage and frequency balancing program 200 is a program for determining optimal (i.e., best, or most effective) voltage/frequency pairs across a given voltage range, with a given clock period for integrated circuit design 114. In another embodiment, voltage and frequency balancing program 200 determines a nominal slack at a nominal voltage and frequency within the given clock period. In some other embodiment, voltage and frequency balancing program 200 utilizes the nominal slack with a statistical static timing analysis (SSTA) and/or multi-corner projection for timing models 116 to calculate alternate optimal voltage/frequency pairs for integrated circuit design 114 within a single SSTA timing run. In yet some other embodiment, voltage and frequency balancing program 200 utilizes one or more of the aforementioned embodiments to determine optimal voltage/frequency pairs. In the depicted embodiment, voltage and frequency balancing program 200 resides on computing device 110. In another embodiment, voltage and frequency balancing program 200 may reside on a server or another computing device (not shown) connected to network 130 provided voltage and frequency balancing program 200 is able to access integrated circuit design 114 and timing models 116.

Figure 2:
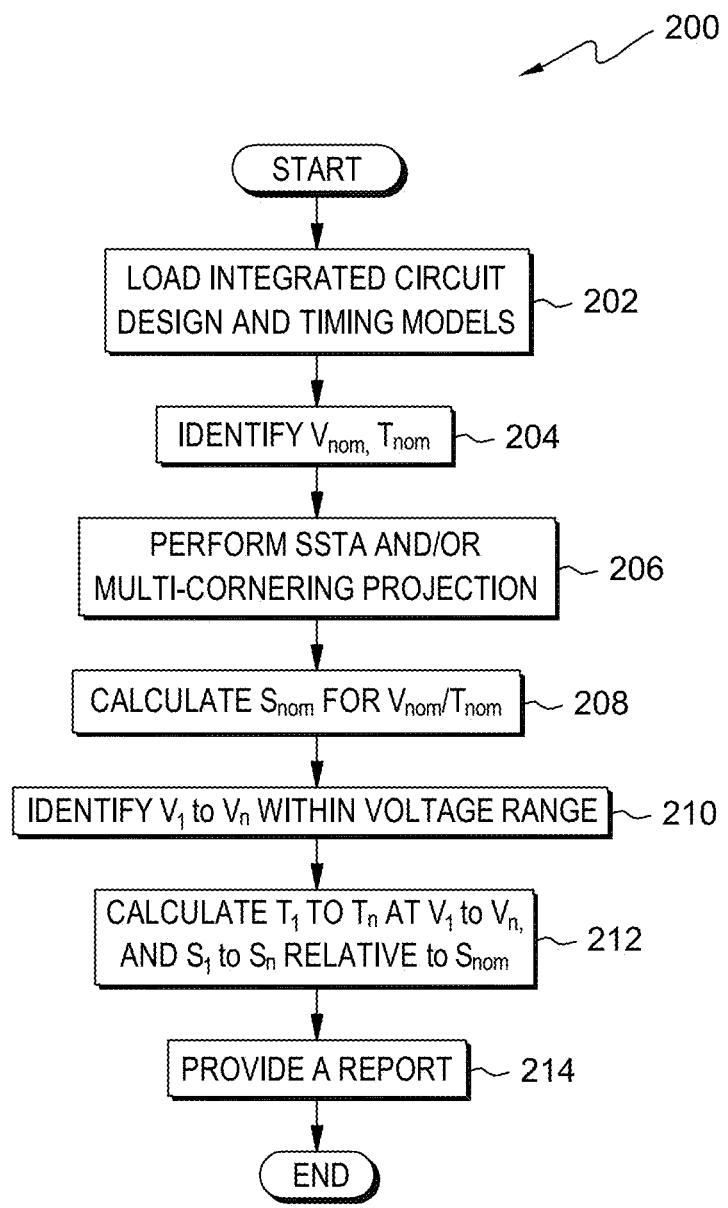
FIG. 2 is a flowchart depicting operational steps of a voltage and frequency balancing program, on a computing device within the statistical static timing analysis environment of FIG. 1, for determining optimal voltage and frequency pairs in a single statistical static timing analysis (SSTA) timing run, in accordance with an embodiment of the present invention.

FIG. 2 is a flowchart depicting operational steps of voltage and frequency balancing program 200, a program for determining optimal voltage/frequency pairs in a single statistical static timing analysis (SSTA) timing run, in accordance with an embodiment of the present invention. In one embodiment, voltage and frequency balancing program 200 is a standalone program. In another embodiment, voltage and frequency balancing program 200 is incorporated within another program as a selectable option and/or automatic test feature within a circuit modeling simulation program. In one embodiment prior to initiating, at least a preliminary instance of integrated circuit design 114 is available that includes an overall configuration with a current layout of the circuit, planned materials, power constraints, input/output values, etc. to meet functional requirements. For example, integrated circuit design 114 is a preliminary design, an intermediate design, or a final design prior to design closure (i.e., process in which integrated circuit design 114 is modified to meet timing requirements, design constraints, and design objectives). In another embodiment, prior to initiating, a modified and/or finalized instance of integrated circuit design 114 is available for selection in order to verify objectives after incorporating modifications to an initial instance of integrated circuit design 114. In one embodiment, voltage and frequency balancing program 200 initiates automatically as a part of testing performed on integrated circuit design 114. For example, voltage and frequency balancing program 200 takes place during system level design to define functionality a specifications for integrated circuit design 114. In another embodiment, voltage and frequency balancing program 200 initiates upon selection by a user through user interface 112 to analyze integrated circuit design 114. Voltage and frequency balancing program 200 initiates upon receipt (e.g., identification) of integrated circuit design 114 and timing models 116 for test (step 202).

In step 202, voltage and frequency balancing program 200 loads integrated circuit design 114 and timing models 116. In one embodiment, voltage and frequency balancing program 200 receives a selection of integrated circuit design 114 and timing models 116 from a script (i.e., macro or batch file of a list of commands that can be executed without interaction from a user) that identifies integrated circuit design 114 and timing models 116 for test. For example, voltage and frequency balancing program 200 runs (e.g., performs, executes) the script file, which identifies a file name and storage location within memory for integrated circuit design 114 and timing models 116 to voltage and frequency balancing program 200. Voltage and frequency balancing program 200 retrieves and loads the identified integrated circuit design 114 and timing models 116 based on the information within the script file. In another embodiment, voltage and frequency balancing program 200 receives a selection of integrated circuit design 114 and timing models 116 from a user via user interface 112. For example the user via user interface 112 identifies integrated circuit design 114 and timing models 116 via a pull down menu selections, an open file command, a load file command, in response to prompts to select files for test, etc. Voltage and frequency balancing program 200 loads integrated circuit design 114 and timing models 116 as identified by the user selections received via user interface 112.

In step 204, voltage and frequency balancing program 200 identifies a nominal voltage ($V_{nom}$) and a nominal clock period ($T_{nom}$). $V_{nom}$ is the voltage at which integrated circuit design 114 is designed to operate. $T_{nom}$ is the nominal clock period that defines the speed (e.g., rate) at which integrated circuit design 114 is designed to operate, which defines the synchronization of the elements of integrated circuit design 114 by identifying the interval at which the rising and falling edges of the clock signal pulse occur. In one embodiment, $T_{nom}$ is a single clock period that defines the nominal clock period at $V_{nom}$, thereby identifying the time taken to complete a single waveform cycle (e.g., picoseconds). In another embodiment, $T_{nom}$ represents multi-cycle functions in which the triggering of a gate utilizes more than one clock cycle for execution. For example, by virtue of the design of a multi-cycle function (e.g., multi-cycle path), for data to traverse from a launching flip-flop to a capturing flip-flop, more than one clock cycle may be needed to compete the data transfer. In an instance in which integrated circuit design 114 includes multi-cycle paths, voltage and frequency balancing program 200 evaluates voltage/frequency pairs with respect to the multi-cycle path. Voltage and frequency balancing program 200 maintains a single voltage/frequency pair for further use, by dividing the clock cycle by the number of cycles (i.e., number of cycles identified by the number of cycles to complete the data transfer) with respect to the slack equation.

In one embodiment, voltage and frequency balancing program 200 identifies $V_{nom}$ and/or $T_{nom}$ based on design parameters associated with integrated circuit design 114 within memory, by a simulation program, and/or based on receipt of a user input via user interface 112 during the creation of integrated circuit design 114. In addition to $V_{nom}$, voltage and frequency balancing program 200 identifies a voltage range (i.e., $V_{min}$ to $V_{max}$), as the voltage for integrated circuit design 114 varies due to process variations. Process variations are naturally occurring variations in attributes of transistors such as length, widths, oxide thicknesses that occur during fabrication of an integrated circuit. Process variations are based on critical dimensions (e.g., oxide thickness, resistivity, etc.) that define the fabrication of integrated circuit design 114 and include a maximum and/or minimum acceptable range based on tolerances set during design. In one embodiment, voltage and frequency balancing program 200 determines the voltage range of $V_{min}$ to $V_{max}$ as a function of the technology. In another embodiment, voltage and frequency balancing program 200 receives the voltage range of $V_{min}$ to $V_{max}$ as a set of design limitations associated with integrated circuit design 114. In yet some other embodiment, voltage and frequency balancing program 200 identifies the voltage range of $V_{min}$ to $V_{max}$ based upon the specifications associated with the voltage regulator (i.e., automatically maintains a constant voltage level by stabilizing the voltage utilized by elements of integrated circuit design 114.) Voltage and frequency balancing program 200 varies the voltage spanning the period identified by $T_{nom}$ across the voltage range of $V_{min}$ to $V_{max}$ when performing the SSTA (step 206).

In step 206, voltage and frequency balancing program 200 performs a statistical static timing analysis (SSTA) and/or multi-corner projection. Multi-corner projection identifies timing quantities at specific process corners by combining the elements of canonical model with the mean of the canonical model. A process corner is a design of experiments (DoE) technique that refers to a variation of fabrication parameters used in applying an integrated circuit design (e.g., integrated circuit design 114) to a semiconductor wafer at a specific condition; typically referring to the process/voltage/temperature (PVT) space, however, any source of variability that changes timing may be included. The process corner represent extremes of fabrication parameter variations within which a circuit etched onto a wafer must function correctly, although the circuit may run slower or faster than specified, and at lower or higher temperatures and voltages. The process corner include: typical-typical (TT), fast-fast (FF), and slow-slow (SS). TT, FF, and SS, are even process corners in which both types of devices are affected evenly, and do not adversely affect the logical correctness of the circuit. FF is a fast corner that exhibits carrier mobility (i.e., how quickly an electron can move through a metal or semiconductor, when pulled by an electric field) that is faster than normal. SS is a slow corner that exhibits carrier mobility that is slower than normal. TT is a typical corner that exhibits carrier mobility that is normal.

In some embodiments, voltage and frequency balancing program 200 separates integrated circuit design 114 into all timing paths, a representative group of best and/or worst case timing paths (e.g., timing paths with the most negative slack and/or most positive slack, timing paths with the most negative slack and/or most positive slack that are within a percentage such as a top ten percent and/or a bottom ten percent), and/or individually selected timing paths for the SSTA. Each identified timing path has a start point (i.e., input port of integrated circuit design 114) and an end point (e.g., output port of integrated circuit design 114) that varies with the type of timing path. For example, for a data path, the start point identifies a place in integrated circuit design 114 that launches the data by a clock edge and the end point identifies the location the data is captured by another clock edge. The timing path encompasses the combinational logic the data propagates through from the starting point to the end point. Voltage and frequency balancing program 200 identifies a delay with respect to integrated circuit design 114 for the voltage based on timing models 116. Voltage and frequency balancing program 200 retrieves the delay via a look-up delay table within timing models 116 that identifies gate types with a slew/load and PVT condition. For example, as voltage and frequency balancing program 200 analyzes integrated circuit design 114, voltage and frequency balancing program 200 retrieves the delay for the input to output of a gate, by identifying the gate type (e.g., look-up within the table), locating the slew/load PVT condition within the identified gate type, and retrieving the associated delay. Voltage and frequency balancing program 200 calculates the signal propagation delay along each path for $V_{nom}$ for each voltage within the voltage range by replacing fixed or normal deterministic timing of gates and interconnects with probability distributions (e.g., a range of probabilities), thereby returning a distribution of possible outcomes rather than a single outcome.

Voltage and frequency balancing program 200 utilizes the sensitivity based approach of SSTA to model the effect of variations on timing for the paths of integrated circuit design 114 with a single source of variation (i.e., voltage). The SSTA generates canonical forms of the timing quantities (i.e., voltage and frequency balancing program 200 creates a canonical variability of frequency dependent tests by parameterizing the clock period and voltage). The canonical forms (e.g., a vector representing a timing quantity such as a delay) include a mean value and sensitivities to each source of variation. In addition, voltage and frequency balancing program 200 calculates the signal propagation delay (i.e., timing quantities) along each path for the voltage range of $V_{min}$ to $V_{max}$ based on a number "n." In an embodiment, the number "n" defines the number of equally distributed data points within the voltage range of $V_{min}$ to $V_{max}$, which voltage and frequency balancing program 200 translates into the size of the increments to cover the voltage range of $V_{min}$ to $V_{max}$. For example, the voltage range is 1v to 2v with the number n set to 10 which equals 0.1v increments starting at 1v and ending at 2v. Voltage and frequency balancing program 200 calculates the signal propagation delay for 1.0v, 1.1v, 1. v, 1.3v, 1.4v, 1.5v, 1.6v, 1.7v, 1.8v, 1.9v, and 2v. Voltage and frequency balancing program 200 changes the voltage within the SSTA in order to identify the limits of integrated circuit design 114.

In another embodiment, voltage and frequency balancing program 200 performs finite difference operations for $V_{nom}$ and across the voltage range of $V_{min}$ to $V_{max}$ based on "n" for integrated circuit design 114 with respect to timing models 116 and the process corners (e.g., TT, FF, and SS) along the paths. For example, for a specific gate, voltage and frequency balancing program 200 calculates the delay at two voltage points. Voltage and frequency balancing program 200 divides the difference of the delay values by the voltage range of the standard deviation points (i.e., sigma values), thus normalizing the voltage sensitivity per unit sigma. Voltage and frequency balancing program 200 utilizes the finite difference result to project the voltage sensitivity to any of the "n" voltage values. Voltage and frequency balancing program 200 utilizes the voltage range of $V_{min}$ to $V_{max}$ in conjunction with the probability distribution (i.e., mean and standard deviation) to provide a statistical model that describes the probability that voltage effects a device or interconnect property within the multi corner projection. Through the SSTA, voltage and frequency balancing program 200 identifies correlations among the delays based on the sensitivities that provide the basis for computing how to add statistical distributions of delays (i.e., model the effect on timing). Voltage and frequency balancing program 200 maps the standard deviations (e.g., finite difference) with respect to the devices and interconnect parameters of integrated circuit design 114 to obtain an overall standard deviation of the path delays.

In step 208, voltage and frequency balancing program 200 calculates a nominal slack ($S_{nom}$) at $V_{nom}/T_{nom}$. In various embodiments, voltage and frequency balancing program 200 projects the canonical period and voltage to the sigma points that represent a nominal point within the distributions. Voltage and frequency balancing program 200 computes a slack at the sigma points. Voltage and frequency balancing program 200 utilizes a slack equation of $S=AT_C+T_C-AT_D-T_G$. Voltage and frequency balancing program 200 solves for S (i.e., slack), which at $V_{nom}/T_{nom}$ represents $S_{nom}$. $T_C$ represents the clock period, $AT_C$ represents the arrival time of the clock signal, $AT_D$ represents the arrival time of the data, and $T_G$ represents the set-up time or guard time which is a characterized value (e.g., added margin to the set-up time) for a flip-flop as characterized in the delay library (e.g., timing models 116). The flip-flop (e.g., latch) is a circuit with two stable states that can store information, in which the flip-flop changes state by applying one or more control inputs that have one or two outputs. The clock signal identifies the earliest time and the latest time that the data can be received by the flip-flop to latch. If voltage and frequency balancing program 200 calculates a positive slack ($S_{nom}$) at $V_{nom}/T_{nom}$, then integrated circuit design 114 is functional. However, if voltage and frequency balancing program 200 calculates a negative slack ($S_{nom}$) at $V_{nom}/T_{nom}$, integrated circuit design 114 is not functional, thereby indicating the clock cycle ($T_{nom}$) is too fast and the clock cycle($T_{nom}$) needs to be slowed down to ensure proper function of integrated circuit design 114.

In step 210, voltage and frequency balancing program 200 identifies $V_1$ to $V_n$ within the voltage range ($V_{min}$ to $V_{max}$). Voltage and frequency balancing program 200 retrieves the values of $V_1$ to $V_n$ as determined within step 206 based on the number "n". For example, the voltage range is 1v to 2v and the number n is set to 10, which equals 0.1v increments starting at 1v and ending at 2v. Voltage and frequency balancing program 200 identifies $V_1$ to $V_n$ as $V_1$=1.0v, $V_2$=1.1v, $V_3$=1.2v, $V_4$=1.3v, $V_5$=1.4v, $V_6$=1.5v, $V_7$=1.6v, $V_8$=1.7v, $V_9$=1.8v, $V_{10}$=1.9v, and $V_{11}$=2v. Voltage and frequency balancing program 200 increments "n" by one in order to include the minimum and maximum voltage values of the voltage range in further calculations. Voltage and frequency balancing program 200 utilizes $V_1$ to $V_n$ in order to calculate $T_1$ to $T_n$ (step 212).

In step 212, voltage and frequency balancing program 200 calculates $T_1$ to $T_n$ at $V_1$ to $V_n$, and $S_1$ to $S_n$ relative to $S_{nom}$. Voltage and frequency balancing program 200 reorganizes the slack equation with equivalent substitutions to solve for $T_C$. For example, Slack (S)=(mean ($AT_C$)+V at $AT_C$)+$T_C$-(mean ($AT_D$)+V at $AT_D$)-$T_G$. Therefore by solving the slack equation for $T_C$, the clock cycle $T_C$ equals S+$T_G$+(mean ($AT_D$)+V at $AT_D$)-(mean ($AT_C$)+V at $AT_C$). In one embodiment, voltage and frequency balancing program 200 uses $S_{nom}$ as a relative slack at $V_1$ to $V_n$ (i.e., $S_1$ to $S_n$ are equal to the value of $S_{nom}$). Voltage and frequency balancing program 200 calculates $T_C$ for each voltage from $V_1$ to $V_n$ utilizing the same slack value of $S_{nom}$ (i.e., voltage is the source of variation within the equation). By utilizing $S_{nom}$, voltage and frequency balancing program 200 identifies alternate optimal voltage and frequency pairs at $S_{nom}$ in addition to the optimal voltage and frequency pair as identified by $V_{nom}/T_{nom}$. In another embodiment, voltage and frequency balancing program 200 creates a scale factor (SF) for the slack at each alternate voltage from $V_1$ to $V_n$. The scale factor is a multiplier (e.g., percentage) of a quantity (e.g., $S_{nom}$) that increments or decrements the value of $S_{nom}$. Voltage and frequency balancing program 200 calculates $T_C$ for each voltage from $V_1$ to $V_n$ by replacing $S_{nom}$ with the value of $S_{nom}$ multiplied by SF. In each subsequent iteration, voltage and frequency balancing program 200 utilizes a recalculated value for the slack value, as the slack value changes as SF varies relative to the value of "n" (e.g., $SF_1$ to $SF_n$). By utilizing SF, voltage and frequency balancing program 200 accounts for non-linear voltage responses within integrate circuit design 114. As delay changes across voltage, the changes in delay vary across voltage. Voltage and frequency balancing program 200 accounts for the non-linearity by scaling the nominal slack $S_{nom}$, as voltage and frequency balancing program 200 translates the voltage at nominal to a different value through the scale factor. Voltage and frequency balancing program 200 calculates different resultant voltage/frequency pairs that are based upon the nominal scaling, and therefore, voltage and frequency balancing program 200 reduces the error due to non-linearity. In additional embodiments, voltage and frequency balancing program 200 drives the design closure for integrated circuit design 114 for $T_C$ more or less aggressively at each alternate voltage as identified by the SF.

In step 214, voltage and frequency balancing program 200 provides report 118. Voltage and frequency balancing program 200 creates and/or provides report 118 to a user at the completion of the analysis for immediate viewing (e.g., onscreen report detailing results for immediate use) and/or storing as an output file that is accessible for future viewing, e-mail, printing, export, etc. by the user. In one embodiment, voltage and frequency balancing program 200 provides report 118 that includes a detailed analysis of integrated circuit design 114 and identifies optimal voltage/frequency pairs. The frequency is related to time, as frequency equals 1/T (e.g., 1/$T_C$). For each value from $V_1$ to $V_n$, voltage and frequency balancing program 200 calculates a frequency based on the calculated value of $T_1$ to $T_n$. Voltage and frequency balancing program 200 identifies the optimal voltage/frequency pairs within the calculated data to identify the best balance of power and performance. Voltage and frequency balancing program 200 identifies a power requirement for a specific voltage and a performance requirement for a specific frequency based on integrated circuit design 114. Voltage and frequency balancing program 200 identifies one or more voltage and frequency pairings that meet a maximum power requirement at voltage, and a minimum frequency target that offer a best power-performance balance as optimal voltage/frequency pairs. In another embodiment, voltage and frequency balancing program 200 provides report 118 with graphs (e.g., histogram, slack wall, yield curve, etc.) for interpretation by users. For example, a graph depicting a slack wall provides an indication that altering integrated circuit design 114 at the site of the slack wall may be problematic, however areas that lack a slack wall may allow for easier modifications to integrated circuit design 114. In another example, the yield curve depicts the slack associated with integrated circuit design 114. As the slack becomes more positive, voltage and frequency balancing program 200 identifies to a user that a higher number of VLSI chips are functional, thereby resulting in a higher yield (i.e., larger amount of usable product is produced). Based on viewing and interpreting the information within the yield curve, the user can then alter the clock speed and/or voltage to improve future yield. In some other embodiments, voltage and frequency balancing program 200 report 118 includes information pertaining to the critical path, arrival time, required time, slack, verification of proper circuit performance of integrated circuit design 114, and identify problem areas (e.g., failures, non-compliance, etc.) and areas for improvement within integrated circuit design 114. In an embodiment, voltage and frequency balancing program 200 includes one or more of the aforementioned embodiments within report 118 for further utilization by a user. Voltage and frequency balancing program 200 completes after providing report 118.

Figure 3:
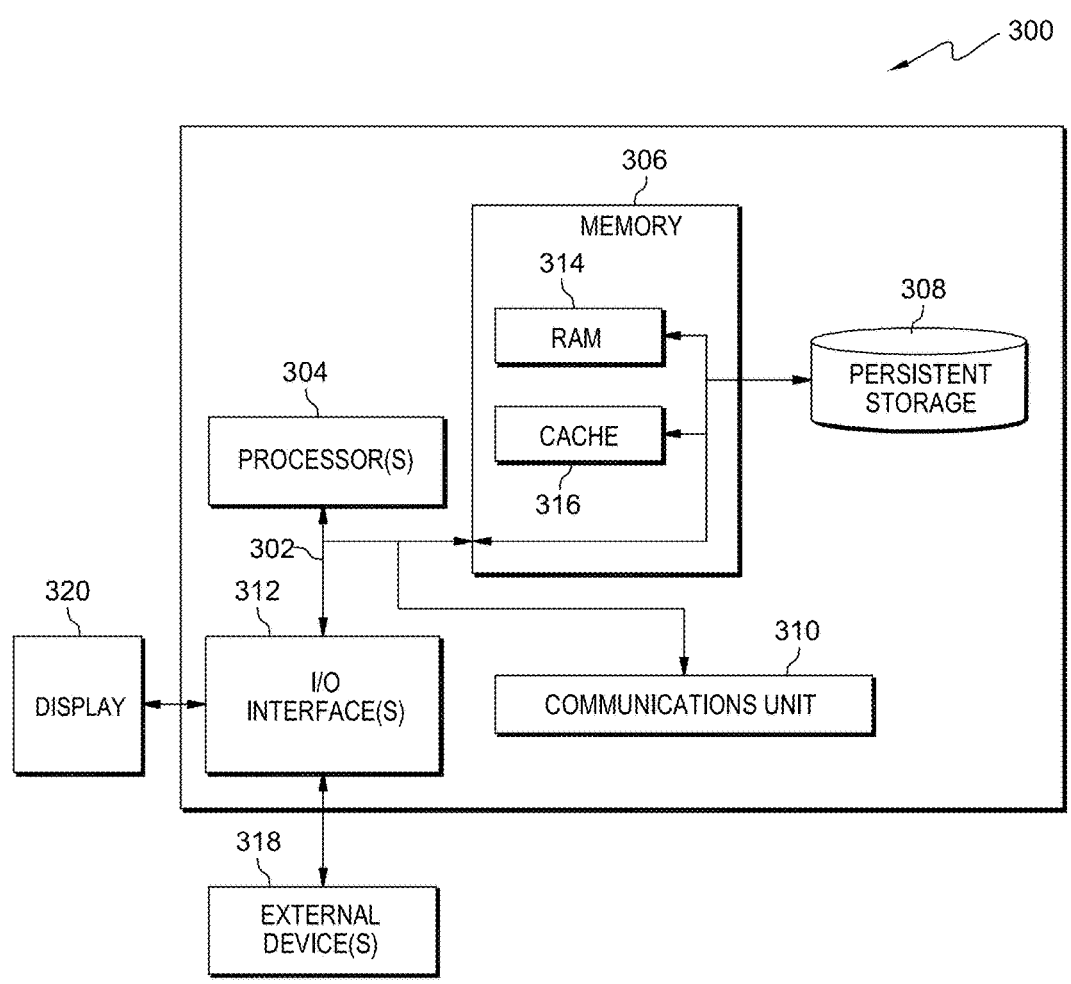
FIG. 3 is a block diagram of components of the computer device executing the voltage and frequency balancing program, in accordance with an embodiment of the present invention.

FIG. 3 depicts a block diagram of components of computing device 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, integrated circuit design 114, timing models 116, report 118, and voltage and frequency balancing program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, integrated circuit design 114, timing models 116, report 118, and voltage and frequency balancing program 200 may be downloaded to persistent storage 308 through communications unit 310.

I/O interface(s) 312 allows for input and output of data with other devices that may be connected to computing device 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, integrated circuit design 114, timing models 116, report 118, and voltage and frequency balancing program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for determining voltage and frequency pairs, the computer system comprising:
   one or more computer processors, one or more computer readable storage media, and program instructions stored on the computer readable storage media for execution by at least one of the one or more processors, the program instructions comprising:
   program instructions to identify an integrated circuit design;
   program instructions to identify a timing model associated with the identified integrated circuit design;
   program instructions to identify at least a nominal voltage, a nominal clock signal, and a voltage range associated with the integrated circuit design;
   program instructions to receive a number n that defines the number of at least one alternate voltage within the voltage range;
   program instructions to analyze the identified integrated circuit based on the received number n for each number n for at least one alternate voltage within the voltage range;
   program instructions to perform a single statistical static timing analysis for the identified integrated circuit based on the received number n for each number n for at least one alternate voltage within the voltage range, wherein the single statistical static timing analysis calculates voltage sensitivity via finite differencing with respect to the identified timing model;
   program instructions to create a canonical variability of frequency dependent tests, wherein the clock period and voltage are parameterized;
   program instructions perform a multi-corner static timing analysis for the identified integrated circuit based on the received number n for each number n for the identified at least one alternate voltage within the voltage range;
   program instructions to calculate a timing at a first voltage point and a timing second voltage point;
   program instructions to calculate a sensitivity to voltage that is a difference between the timing at the first voltage point and the timing at a second voltage point;
   program instructions calculate a nominal slack;
   program instructions to calculate one or more clock periods based on the calculated nominal slack;
   program instructions to solve a slack equation for a clock period;
   program instructions to calculate the clock period for each number n by inserting each calculated voltage for each number n into the solved slack equation for the clock period;
   program instructions to provide a report based on the calculated one or more clock periods;
   program instructions to optimize a voltage and frequency pairing for a best power-performance balance, wherein the voltage and frequency pairing meets a maximum power and a minimum frequency; and program instructions to manufacture an integrated circuit based upon an optimized integrated circuit design using the optimized voltage and frequency pairing.

\* \* \* \* \*